US011891283B1

(12) United States Patent
Frescas

(10) Patent No.: US 11,891,283 B1
(45) Date of Patent: Feb. 6, 2024

(54) CONCAVE PERSONNEL BASKET FOR AN AERIAL WORK PLATFORM

(71) Applicant: Ralph Frescas, San Jose, CA (US)

(72) Inventor: Ralph Frescas, San Jose, CA (US)

( * ) Notice: Subject to any disclaimer, the term of this patent is extended or adjusted under 35 U.S.C. 154(b) by 0 days.

(21) Appl. No.: 18/058,481

(22) Filed: Nov. 23, 2022

Related U.S. Application Data

(60) Provisional application No. 63/370,429, filed on Aug. 4, 2022.

(51) Int. Cl.
*B66F 11/04* (2006.01)
*B66F 17/00* (2006.01)

(52) U.S. Cl.
CPC .......... *B66F 11/044* (2013.01); *B66F 17/006* (2013.01)

(58) Field of Classification Search
CPC ......................... B66F 11/04–046; B66F 9/127
See application file for complete search history.

(56) References Cited

U.S. PATENT DOCUMENTS 3,085,650 A * 4/1963 Merk ........................ E06C 5/04 182/148
4,690,246 A * 9/1987 Hornagold ............ B66F 11/046 182/19
6,173,810 B1 1/2001 Citron et al.
6,371,243 B1 4/2002 Donaldson et al.
2016/0069094 A1* 3/2016 Lombardi ............... E04G 3/243 182/222
2018/0195589 A1* 7/2018 Mark .................... B66F 17/006
2019/0315611 A1* 10/2019 Calomino ........... B66F 9/07559

OTHER PUBLICATIONS

OSHA Standards. "Walking Working Surfaces—Fall Protection systems and falling object protection—criteria and practices". https://www.osha.gov/laws-regs/regulations/standardnumber/1910/1910.29 (Year: 2019).*

* cited by examiner

*Primary Examiner* — Tyrone V Hall, Jr.
(74) *Attorney, Agent, or Firm* — Stephen E. Zweig

(57) ABSTRACT

A concave personnel basket for an aerial work platform such as a boom lift is disclosed. The personnel basket is configured with a middle portion, facing away from the boom lift, that is recessed several feet towards the boom lift. The basket also has two opposite ends, also facing away from the boom lift, that protrude several feet outward relative to the middle portion. As a result, the personnel basket can partially envelop convex target structures such as cell towers and building corners. Personnel standing in the basket can thus access multiple sides of the target without needing to command the boom lift to reposition the basket. This improves work efficiency and safety.

18 Claims, 11 Drawing Sheets

Boom lift side

Boom lift Side

CONCAVE PERSONNEL BASKET FOR AN AERIAL WORK PLATFORM

CROSS REFERENCE TO RELATED APPLICATIONS

This application claims the priority benefit of U.S. provisional application 63/370,429, "CONCAVE PERSONNEL BASKET FOR AN AERIAL WORK PLATFORM". inventor Ralph Frescas, filed Aug. 4, 2022, the entire contents of which are incorporated herein by reference.

BACKGROUND OF THE INVENTION

Field of the Invention

This invention is in the field of aerial work platforms for personnel (workers), such as boom lifts and other types of devices.

DESCRIPTION OF THE RELATED ART

Aerial work platforms are frequently used to elevate workers above the ground for construction and maintenance on elevated structures. Such aerial work platforms can include cherry pickers, scissor lifts, and various types of boom lifts.

These aerial work platforms typically operate by elevating a rectangular personnel basket, usually configured to hold a small number of workers above the ground and close to the elevated work target of interest.

Boom lifts are made by various companies, such as Terex Corporation, Norwalk, Conn.. Terex makes the popular Genie boom lift series and other aerial work platforms. These Genie boom lifts are covered by U.S. Pat. Nos. 6,173,810; 6,371,243; and other patents, the entire contents of which are incorporated herein by reference.

BRIEF SUMMARY OF THE INVENTION

The invention was inspired, in part, by the insight that the traditional rectangular shape of a boom lift personnel basket is not ideal for handling certain types of situations. This rectangular shape has problems with the corners of buildings, and cellular telephone towers (cell towers), where the target of interest has a convex structure. FIG. 1 shows the problem when prior art personnel baskets encounter concave targets, such as the cellular tower shown. Workers inside the basket can only get close to one side of the target. The basket must be moved to reach other sides of the target. Here, the personnel in the basket need to command the boom lift to reposition the basket. Each move takes time, and each action has some associated risk. This is undesirable.

The invention illustrates an alternative, concave-shaped personnel basket better suited for convex targets such as cell towers.

In some embodiments, only the center of the side of the personnel basket opposite to the boom lift (away facing middle portion) is indented or otherwise made concave in order to allow closer access to a convex target. By contrast, even the entire side of the personnel basket facing the boom lift can continue to be linear (see FIG. 4, 101). The net effect would be to produce a shape that looks not unlike a rectangle with a bite taken out of the middle of the side facing away from the boom lift. These embodiments are not disclaimed. However, this configuration has some drawbacks, as the two sides opposite the middle become wider than needed, and this can make it harder to maneuver the basket around various obstructions near the convex target.

The invention is based on the further insight that in a preferred embodiment, the invention will provide more of a "C" shaped work platform that allows workers to move freely throughout the platform, is concave enabling close proximity to a convex target, yet presents a minimal amount of excess area that could potentially encounter nearby obstructions.

Personnel baskets are frequently constructed of durable metal tubing, such as aluminum or steel tubing, and such tubing is usually manufactured in straight lengths. To reduce construction costs, it is often desirable to consider fabricating the personnel basket by bonding nominally straight metal tubing, using curved connectors as desired, into various polygons that approximate this ideal "C" shape. Such designs can include concave, symmetrical, 12-sided irregular polygons, and the like. Although, this disclosure teaches a design that somewhat resembles a type of symmetrical, concave, 12-sided irregular polygon arranged in roughly a "C" shape, this particular design is not intended to be limiting.

DETAILED DESCRIPTION OF THE INVENTION

Figure 1:
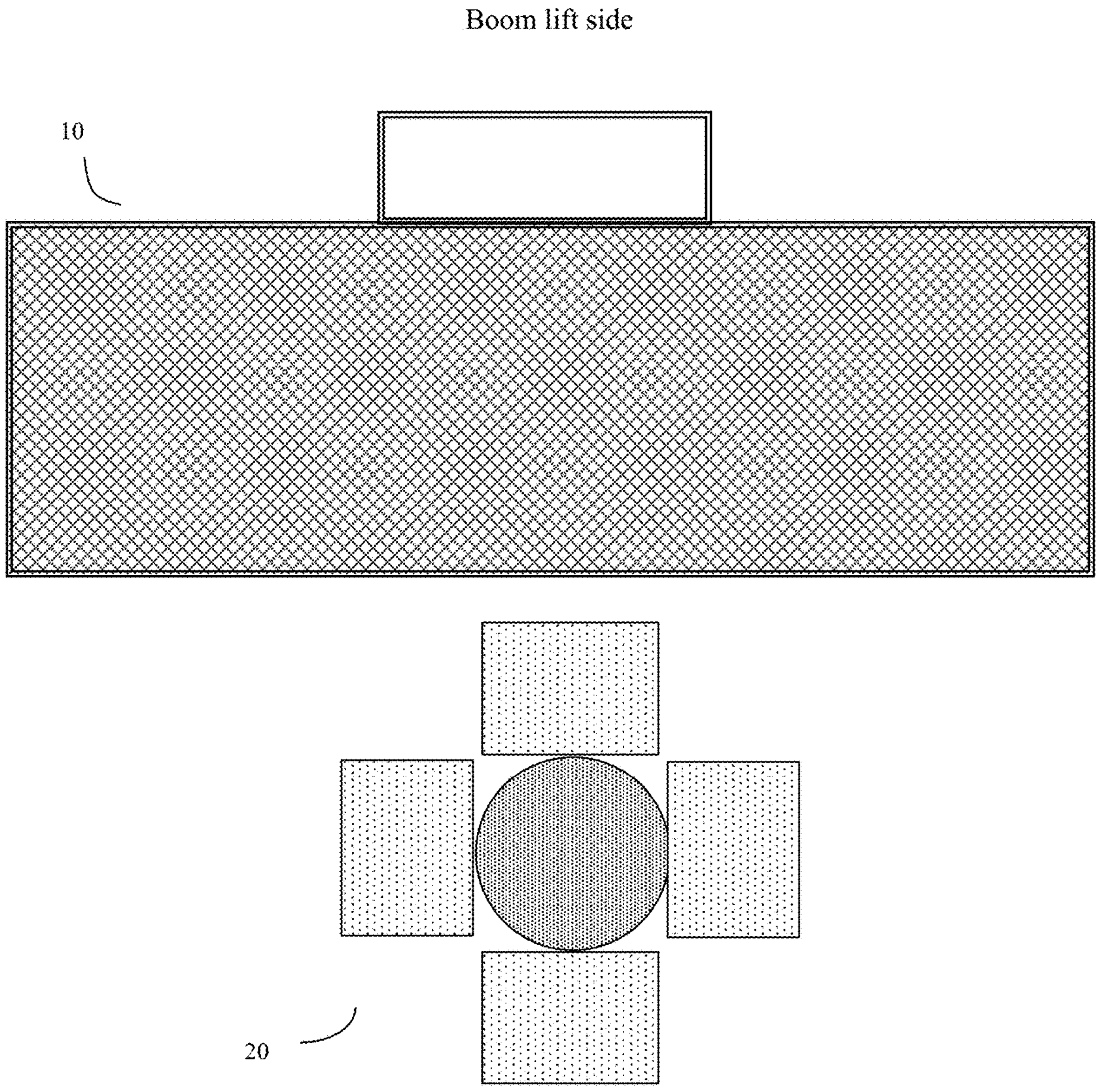
Fig. 1 (Prior art)
FIG. 1 shows a top view of a prior art rectangular personnel basket, showing how the prior art baskets were less effective at allowing access to convex targets. With the prior art basket design, the personnel needed to command the boom lift to reposition the rectangular (prior art) personnel basket multiple times to provide the same access to various sides of the convex target.

FIG. 1 shows a top view of a prior art rectangular personnel basket (10), showing how the prior art baskets were less effective at allowing access to convex targets (20). With the prior art basket design, the personnel needed to command the boom lift to reposition the rectangular personnel basket multiple times to provide access to various sides of the convex target.

Figure 2:
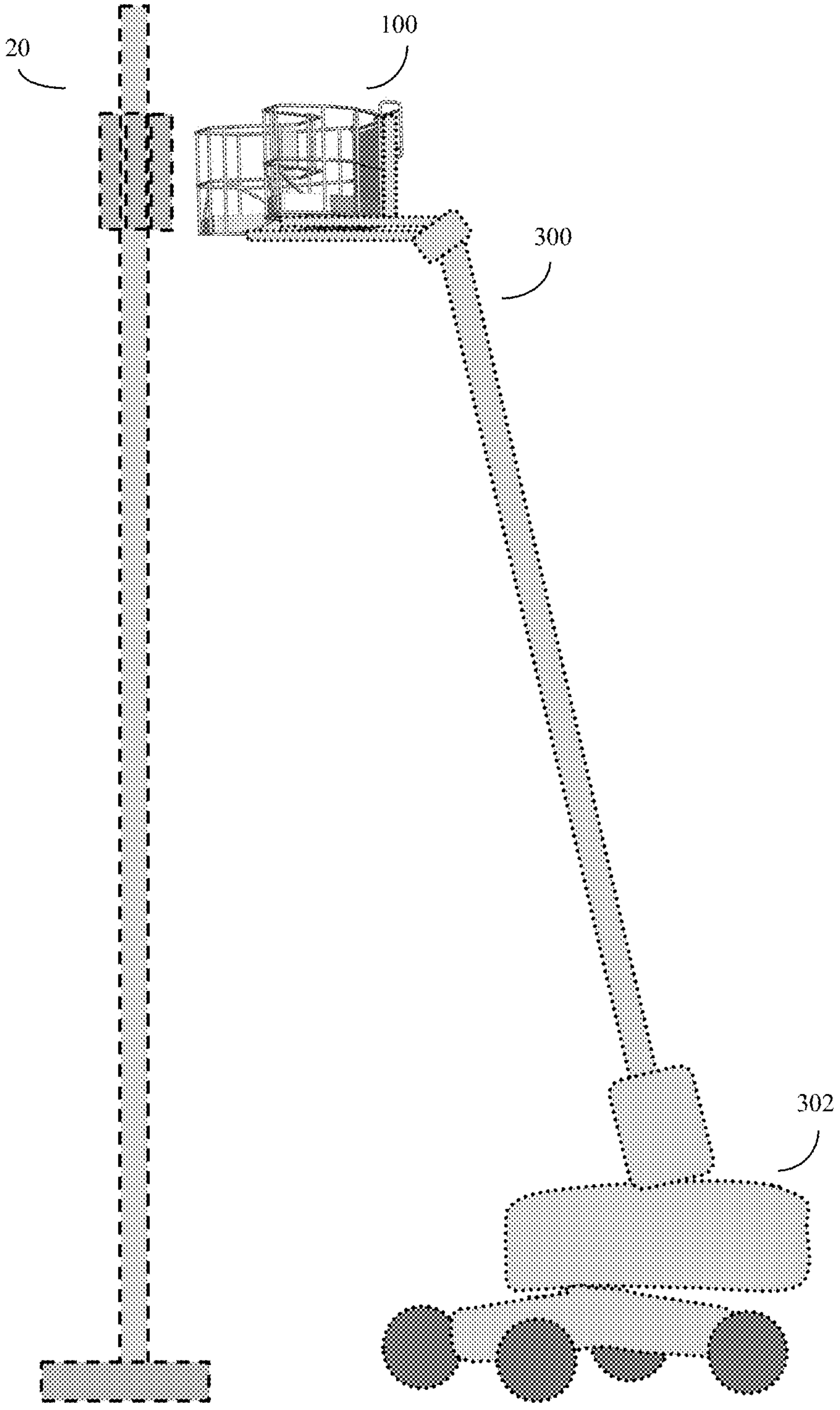
FIG. 2 shows a drawing of the concave personnel basket attached to the boom arms of a prior art boom lift. The concave perimeter of the personnel basket allows personnel working inside the basket to simultaneously work on multiple sides of an elevated convex target, such as a cell tower.

FIG. 2 shows a drawing of the invention's improved concave personnel basket (100) attached to the boom arms (300) of a prior art boom lift (302). As will be discussed, the concave perimeter of the personnel basket allows personnel working inside the basket to simultaneously work on multiple sides of an elevated convex target (20), such as a cell tower.

In some embodiments, the invention may be a personnel basket (100) for an aerial work platform, such as a boom lift. This basket will typically comprise a basket floor (104) with a floor top, floor bottom, and a floor perimeter with a plurality of floor sides. This floor bottom is typically configured with the center portion of the basket configured to attach to the lift surfaces (boom arms 300) of a boom lift (302) on a boom lift side of the floor perimeter. In some embodiments, the floor may be configured as a symmetrical, concave, irregular 12-sided polygon. Other shapes, including different types of concave irregular polygons, or curved surfaces, may also be used.

The basket is typically made from metal, such as steel or aluminum mesh, plate, and tubing. Other strong, light, and rigid materials may also be used.

Figure 3A:
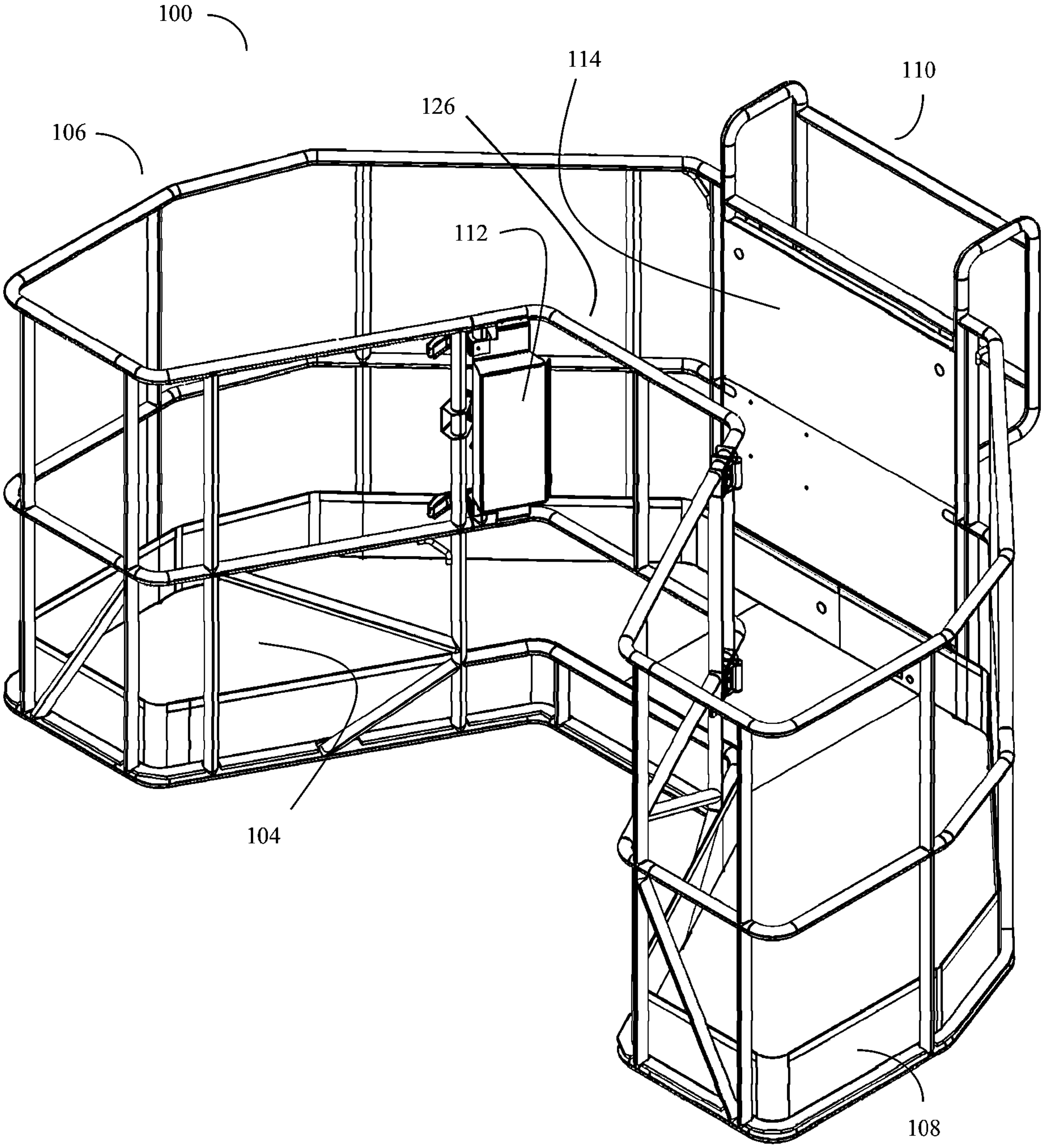
FIG. 3A shows a perspective view of the concave personnel basket, showing the floor, guard rail, kick plate, enclosure rails for a boom lift control box, and gate with a safety latch. A boom-side safety plate is also present. The control box enclosure defines the boom lift side of the basket.

FIG. 3A shows a perspective view of the concave personnel basket (100), showing the floor (104), guard rail (106), kick plate (108), enclosure rails for a boom lift control box (110), and gate (126) with safety latch (112). The control box enclosure (110) defines the boom lift side of the basket. A boom-side safety plate (114) is also present.

The top of the floor (104) is configured with a substantially flat surface, often metal plate or metal mesh configured to allow at least one adult person to stand on the floor top while the floor bottom is attached to the lift surfaces (300) of a boom lift (302), and lifted above the ground by the boom lift.

Figure 3B:
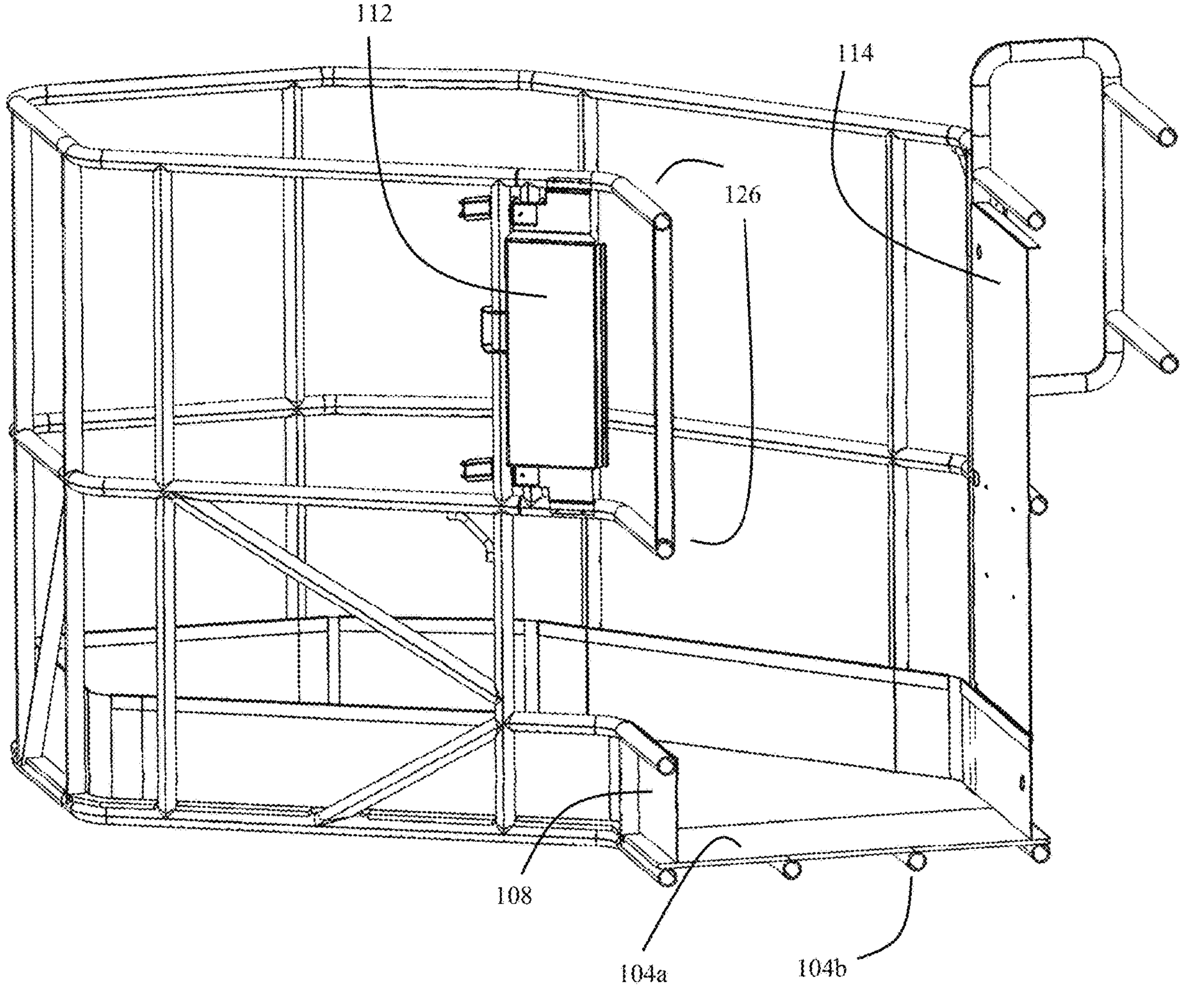
FIG. 3B shows a cross section across the center of the concave personnel basket. This cross section more clearly shows that the floor comprises a sheet metal surface, grill, or plate arranged on top of the floor support formed from metal tubing. Details of the access gate safety lock can also be better seen.

FIG. 3B shows a cross section across the center of the concave personnel basket (100). This cross section more clearly shows that the floor (104) comprises a sheet metal surface, grill, or plate (104*a*) arranged on top of the floor support metal tubing (104*b*). Details of a portion of the access gate (126) and its safety lock (112) can also be better seen.

Figure 3C:
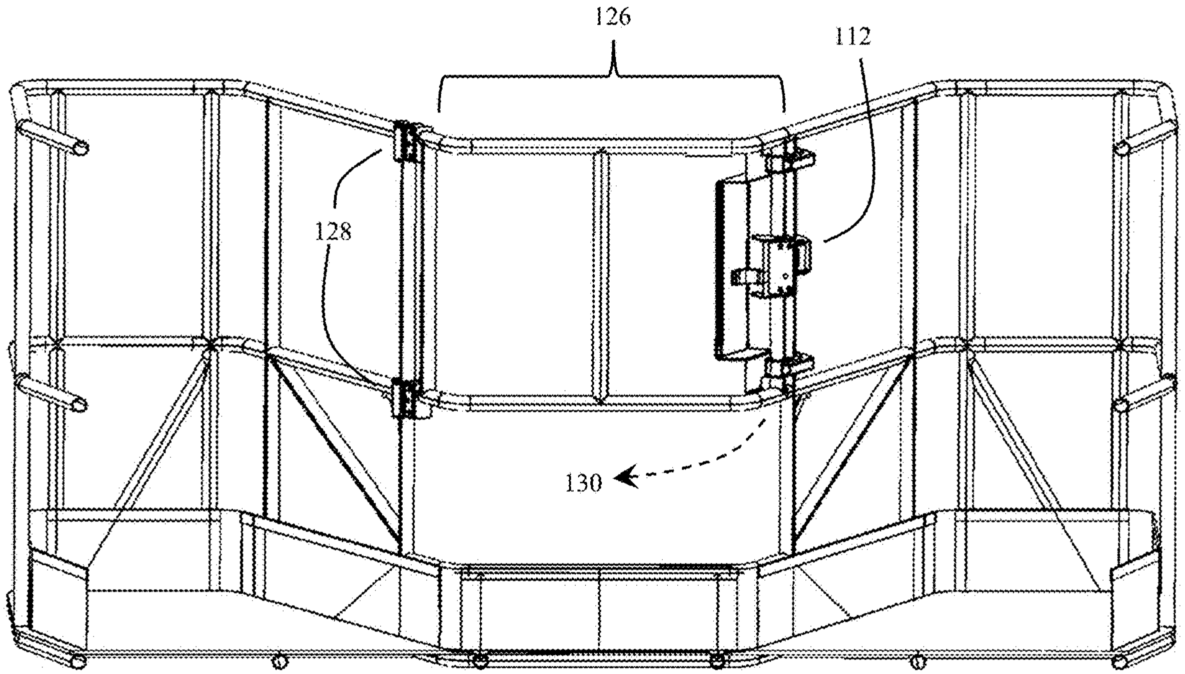
FIG. 3C shows a different cross section across the long axis of the personnel basket (100). This cross section more clearly shows details of the access gate, including the hinges and safety lock.

FIG. 3C shows a different cross section across the long axis of the personnel basket (100). This cross section more clearly shows the full width of the access gate (126), including the gate's hinges (128) and safety lock or latch (112). In some embodiments, for safety purposes, the gate and latch may be configured so that the gate only opens in an inward direction (130) towards the interior of the basket.

As shown in FIG. 3C, a portion of the guard rail further comprises a hinged gate (126) and a latch (112) configured to open and shut. This gate is configured to swing inward (towards the boom) when the latch is open, thus enabling personnel use the gate to enter and exit the basket. The gate configured to remain shut when the latch is shut, thus protecting personnel inside the basket from accidentally falling out of the basket. Although the gate may be positioned in multiple locations around the perimeter, in a preferred embodiment, the gate is disposed in the away facing middle portion of the basket on a side opposite to the boom lift.

Figure 3D:
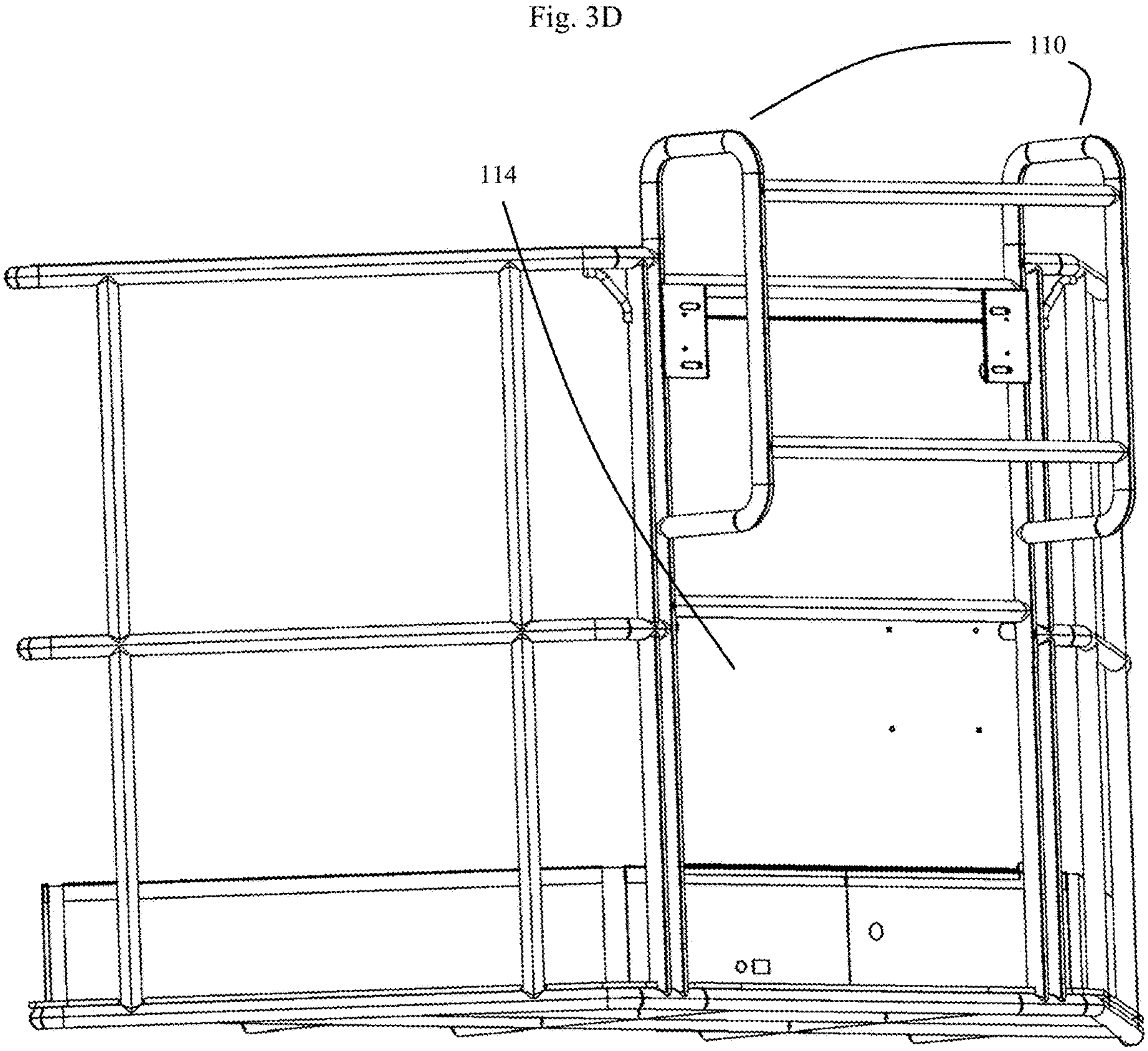
FIG. 3D shows a cross section showing the opposite cross section from FIG. 3C, here showing the outside back and portions of the bottom of the personnel basket from the direction of the boom lift.

FIG. 3D shows the opposite cross section from FIG. 3C, here showing the outside back control box area (110), boom side safety plate (114), and portions of the bottom of the personnel basket as seen from the outside of the basket looking from the direction of the boom lift. Various types of boom lift control boxes will typically be bolted to the basket in the control box area (110). This allows personnel, standing inside of the basket (100), to control the operation of the boom lift.

Figure 3E:
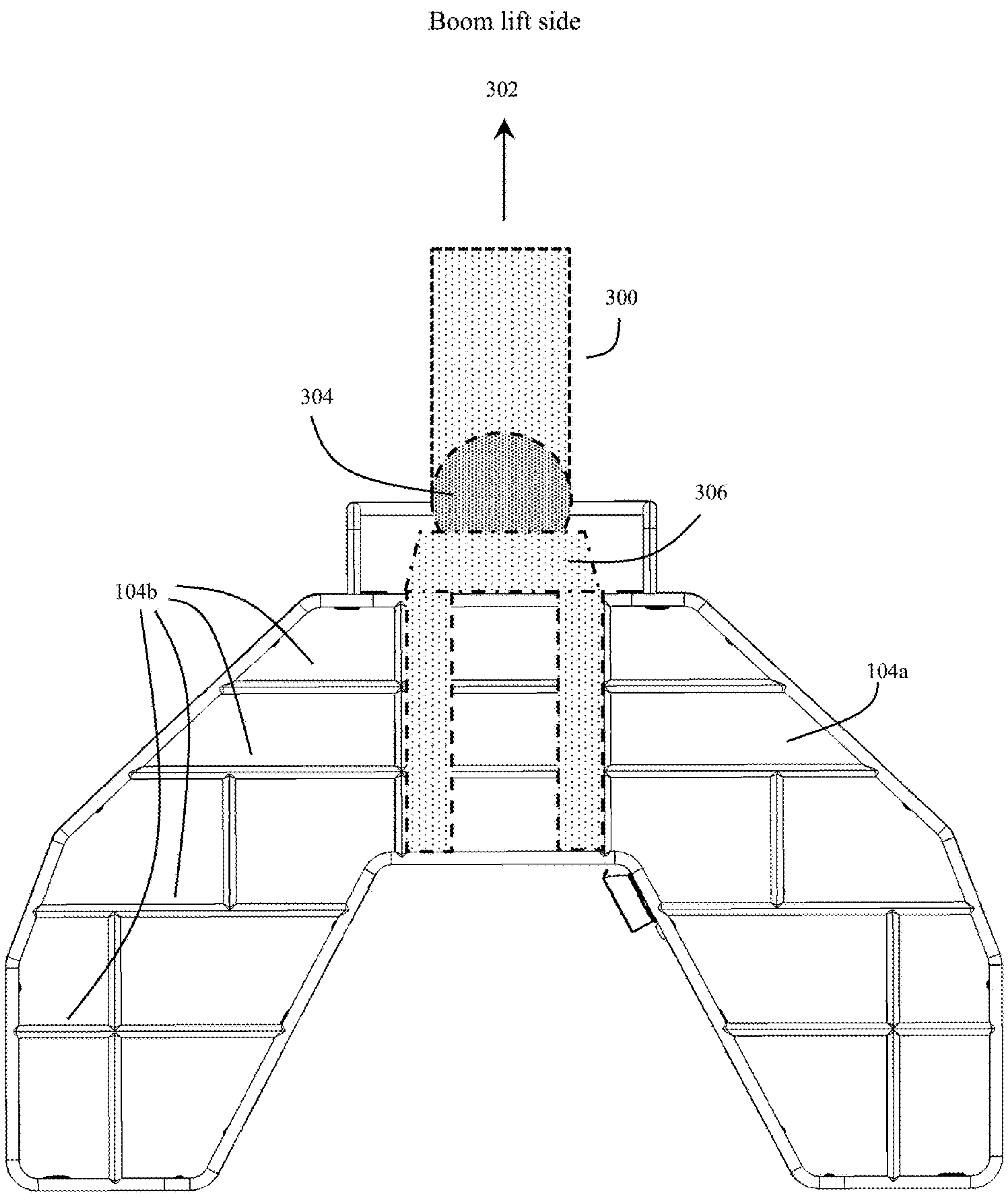
FIG. 3E shows the bottom of the personnel basket, showing additional details of how the basket can be attached to and supported by various boom lift cage support mechanisms, such as a basket rotator device.

FIG. 3E shows the bottom of the personnel basket, showing additional details of how the basket can be attached to and supported by various boom lift cage support mechanisms or coupler mechanisms, such as a basket rotator device (304). Here the arrow is pointing towards the location of the boom lift (302).

In some embodiments, the center portion of the basket is configured to attach to a boom lift arm (300) on the boom lift side of the floor perimeter by a boom-lift-to-cage coupler mechanism comprising a basket rotator (304) and at least one support beam or bracket (306).

Figure 4:
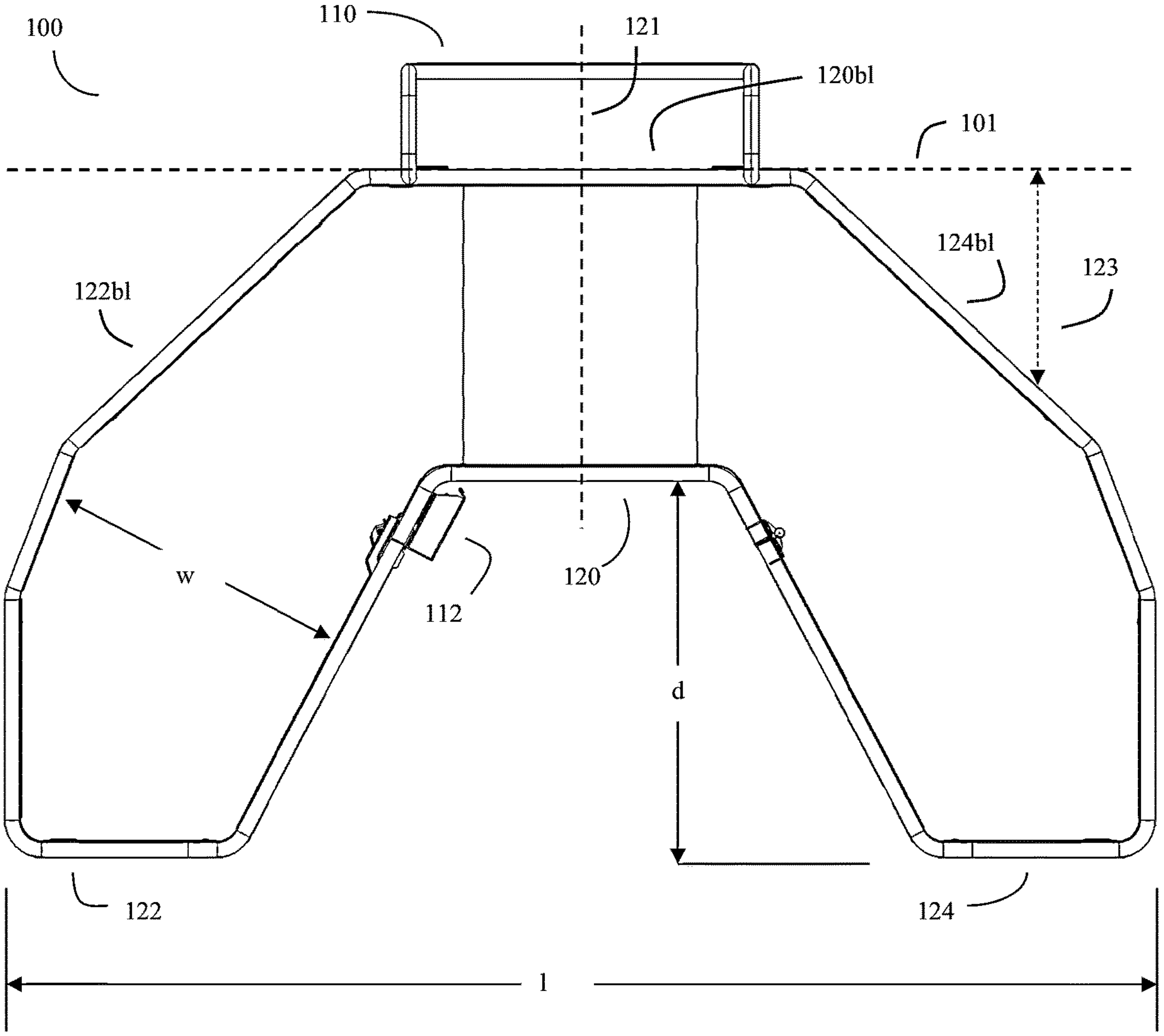
FIG. 4 shows a top view of the concave personnel basket. The middle portion of the basket floor (the away facing middle portion) and associated guard rails, is disposed inwards, usually, at least two feet (often three feet or more) towards the boom side of the basket, relative to the left and right away facing opposite ends of the basket, thus forming a concave shape. By contrast, the two away facing opposite ends of the basket are disposed outwards, away from the boom lift side of the basket and the away facing middle portion. In some embodiments, the basket will have a total length of between six and ten feet and an approximate width of at least two feet.

FIG. 4 shows a top view of the concave personnel basket (100). The away facing middle portion of the basket floor (120), and associated guard rails, is disposed inwards by a distance "d". This is usually at least two feet (minimum 18 inches, maximum about 6 feet, often three feet or more) towards the boom side of the basket, relative to the left and right away facing opposite ends of the basket, thus forming a concave shape. By contrast, the two away facing opposite ends of the basket are disposed outwards, away from the boom lift side of the basket. In some embodiments, the basket will have a total length "1" often between six and ten feet (minimum 4 feet, maximum 12 feet, usually about 8 feet), and an approximate width "w" of at least two feet (typically between 18 inches and 4 feet).

The floor perimeter of the basket floor (104) and the plurality of floor sides are thus typically configured with at least an away facing middle portion (120), and two away facing opposite ends (122, 124). The floor perimeter is thus further configured in a concave shape with the central portion (120) disposed inwards, towards the lift side (control basket side 110), and the two away facing opposite ends (122, 124) are disposed outwards, away from the boom lift side, thus allowing the basket floor (104), and a person walking along the basket floor, to more closely approach multiple sides of a convex target area (20) while the basket and floor is lifted above the ground by a boom lift (302).

In a preferred embodiment, the concave personnel basket (100) is substantially symmetric, with an axis of symmetry (121) about the middle portion of the basket. Here the two opposite ends of the basket (122, 124) are substantially symmetrical to each other, so that the two opposite ends are mirror images of each other. As previously discussed, this particular type of configuration can be viewed as being a type of concave, symmetric, 12-sided irregular polygon.

The floor perimeter is further configured with a guard rail (106), usually raised at least three feet (between 2-5 feet, usually about 3 feet to 46 inches) above the floor top.

More specifically, in some embodiments, the two away facing opposite ends (122, 124), and their associated guard rails (106), are displaced outwards (by a distance "d") two feet or more from the away facing middle portion (120) its associated guard rails (106). As previously discussed, the distance ("1") between one end of one opposite side (122) and the other end of the other opposite side (124) will often be at least six feet.

In some embodiments, the portion of the guard rail associated with the away facing middle part of the floor (120) distal from the boom lift side of the floor perimeter will further comprise a safety latch type gate (112).

Additionally, in some embodiments, the guard rail (106) may further comprise at least one kick plate (108) disposed next to the floor bottom (104). This kick plate will often be between six inches and two feet high, usually about 1 foot high.

In some embodiments, the guard rail associated with the boom lift side middle portion (**120*bl*) next to the boom lift side of the floor perimeter may further comprise a support (110**) for a substantially rectangular boom lift control box. This support may often be configured to fit industry standard boom lift control boxes, such as control boxes for Genie boom lifts and the like. That is, the support dimensions will admit an industry-standard control box and keep the control box relatively secure while the boom lift lifts the basket into the air.

In some embodiments, the guard rail may have at least one safety line attachment region. These regions may be "eyes" or small enclosures where snap hooks or other attachment devices may be securely attached to the guard rail.

Although in principle, the basket may be designed to accommodate a broad range of users (personnel) and to accommodate a wide range of weights, often the basket will be configured to carry between 1-4 people (such as up to three adults) and lift a weight of at least 800 pounds.

Note that in the configurations shown herein, the floor perimeter of the basket floor and the plurality of floor sides is configured with at least an away facing middle portion (120) and two opposite ends. This floor perimeter is further configured in a concave shape with the away facing middle portion, and its associated guard rails, disposed at least two feet inwards towards the boom lift side of the cage. By contrast, the two away facing opposite ends, and their associated guard rails, are disposed at least two feet outwards away from the boom lift side on both the sides facing towards and facing away from the boom lift.

Other designs are possible, however. In some embodiments, only the side of the cage facing away from the boom lift needs to be concave, and the side of the cage in the boom lift direction (**122*bl*, 120*bl*, 124*bl*) can continue to be straight, as in the prior art design shown in FIG. 1, and FIG. 4 (101). Here, for example, (122*bl*, 120*bl*, and 124*bl*) can all fall along line (101). That is, the cage side facing towards the boom lift does not need to be concave, because this side does not need to wrap around convex target areas, such as FIG. 5 (20**).

Thus, to generalize the invention, the two away facing opposite ends (122, 124), and their associated guard rails, need to be disposed at least two feet outwards from the boom lift side (relative to the away facing middle 120) only on the side of the cage that faces away from the boom lift. Put alternatively, the two away facing opposite ends (122, 124), and their associated guard rails, are disposed, on at least the side facing away from the boom lift, at least two feet outwards further away, relative to the away facing middle side (120), from the boom lift side.

In a preferred embodiment, however, as shown in FIG. 4 and elsewhere, at least portions of the two opposite ends, and their associated guard rails, are often disposed, at least two feet further outwards away from boom lift middle (**120*bl*) of the boom lift side (see FIG. 4, 123) on both the boom lift side (122*bl*, 124*bl*), as well as the away facing side (122, 124**) facing away from the boom lift.

Thus, more generally, the floor bottom can be viewed as comprising sides facing at least somewhat towards the boom lift (such as **122*bl*, 120*bl*, and 124*bl*), and sides (such as 120, 122, 124) facing substantially away from the boom lift. As previously discussed, the floor top (104*a*) will often be configured with a substantially flat surface, grate, or grill, configured to allow at least one adult person to stand on the floor top while the floor bottom (104*b*) and the remainder of the cage is attached to the boom lift (302), and lifted above the ground by the boom lift. The floor perimeter of the basket floor and the plurality of floor sides are typically configured with at least a away facing middle portion (120) and two away facing opposite ends (122, 124). This floor perimeter is typically further configured in a symmetrical (relative to the axis of symmetry 121) concave shape with at least the side of the away facing middle portion facing away from the boom lift side (120), and its associated guard rails, disposed at least two feet (d) further inward towards the boom lift side, relative to the two away facing opposite ends (122, 124). The two away facing opposite ends (122, 124), and their associated guard rails, are disposed, on at least the sides facing away from the boom lift (122, 124), at least two feet further outwards away from the boom lift side (d), relative to the away facing middle portion (120**).

As previously discussed, in a preferred embodiment, in addition to the two away facing opposite ends (122, 124), and their associated guard rails, being disposed at least two feet outwards away from the boom lift side, relative to the away facing middle portion (120), the other side of the cage will be non-linear as well. Here, at least a portion of the boom lift side opposite sides (**122*bl*, 124*bl*) facing the boom lift will also be displaced (123) away from the boom lift and the boom lift facing middle portion (120*bl***), thus producing a "C" like shape better adapted for getting close to the target.

Figure 5:
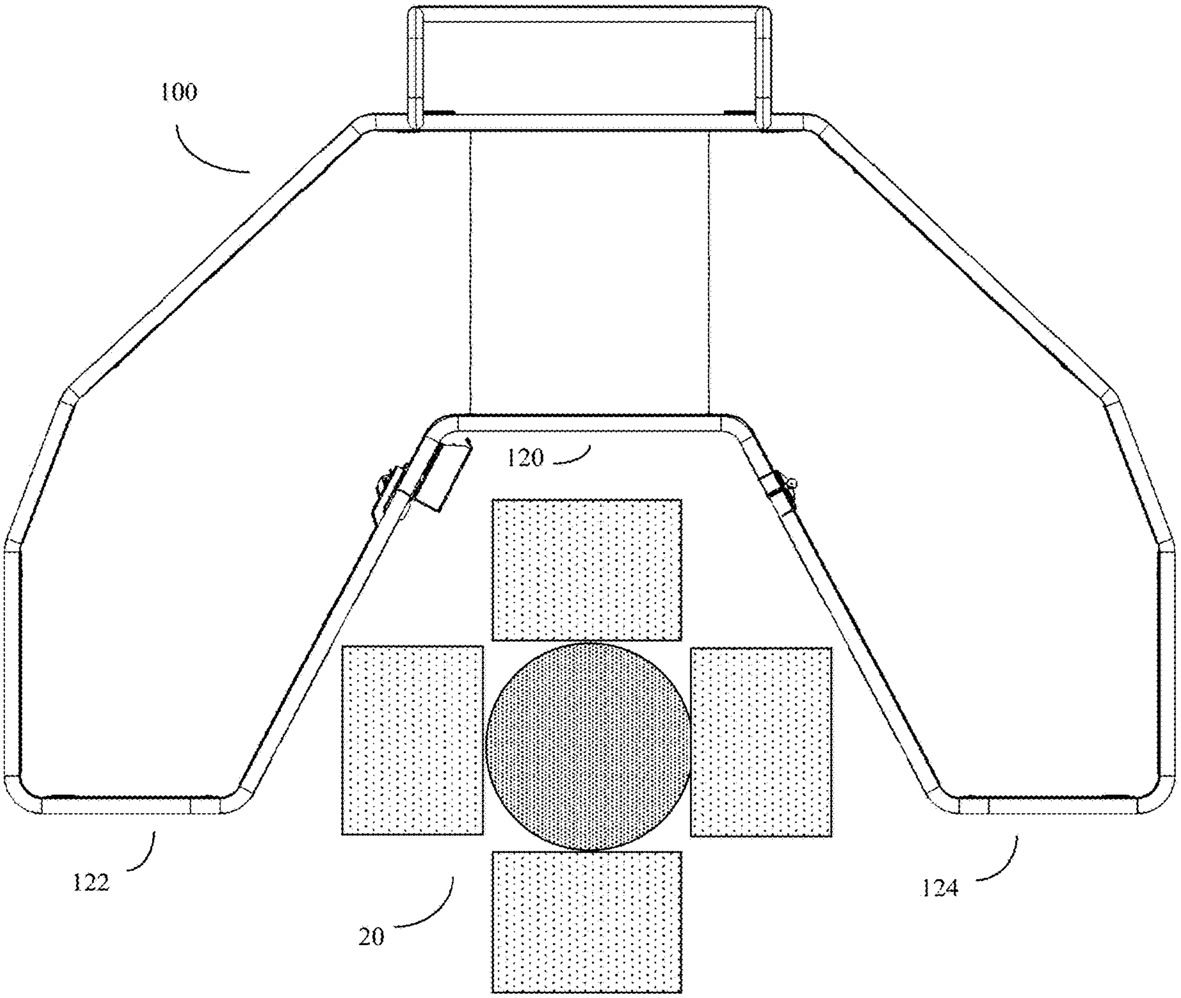
FIG. 5 shows a top view of the concave personnel basket, here showing how the concave structure can envelop multiple sides of an elevated convex target, such as the antennas of a cellular telephone tower. This allows personnel greater access to different sides of the convex target without the need to command the boom lift to reposition the basket.

FIG. 5 shows a top view of the concave personnel basket (100), here showing how the concave (e.g., open) structure formed by the away facing middle region (120) and the two away facing opposite ends (122, 124) can envelop multiple sides of an elevated convex target, (20). Here the antennas of a cellular telephone tower are shown. This allows personnel to have greater access to different sides of the convex target without the need to command the boom lift (302) to reposition the concave personnel basket (100).

Figure 6:
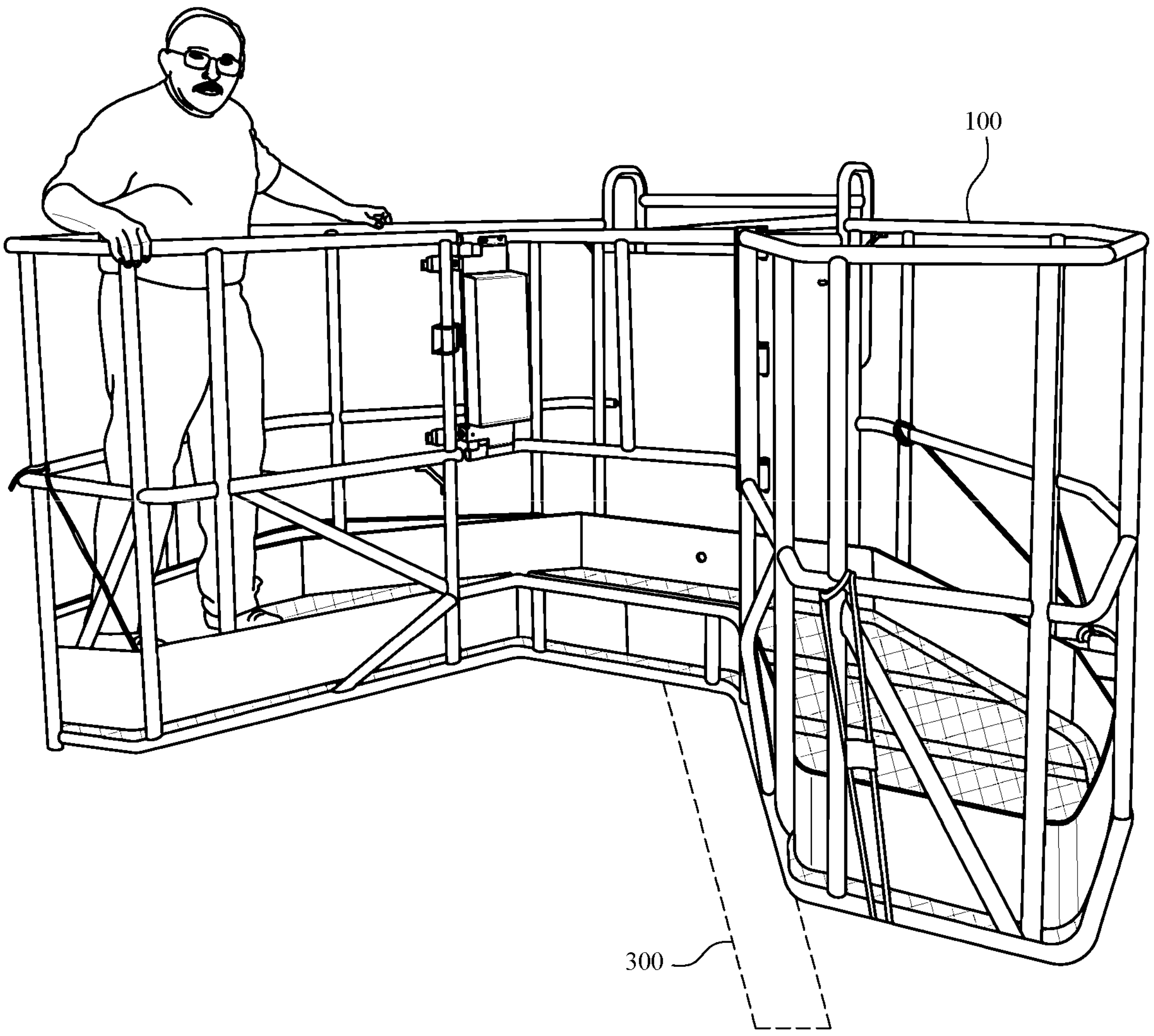
FIG. 6 shows a photograph of a prototype of the concave personnel basket, showing an adult human user (personnel) standing on the floor on the left end of the basket. The dotted lines show the approximate location of the boom lift's boom. This version of the concave basket can easily accommodate three users.

FIG. 6 shows a photograph of a prototype of the concave personnel basket (100), showing an adult human user (personnel) standing on the floor on the left end of the basket. The dotted lines show the approximate location of the boom lift's boom (300). This version of the concave basket can easily accommodate three users.

Figure 7:
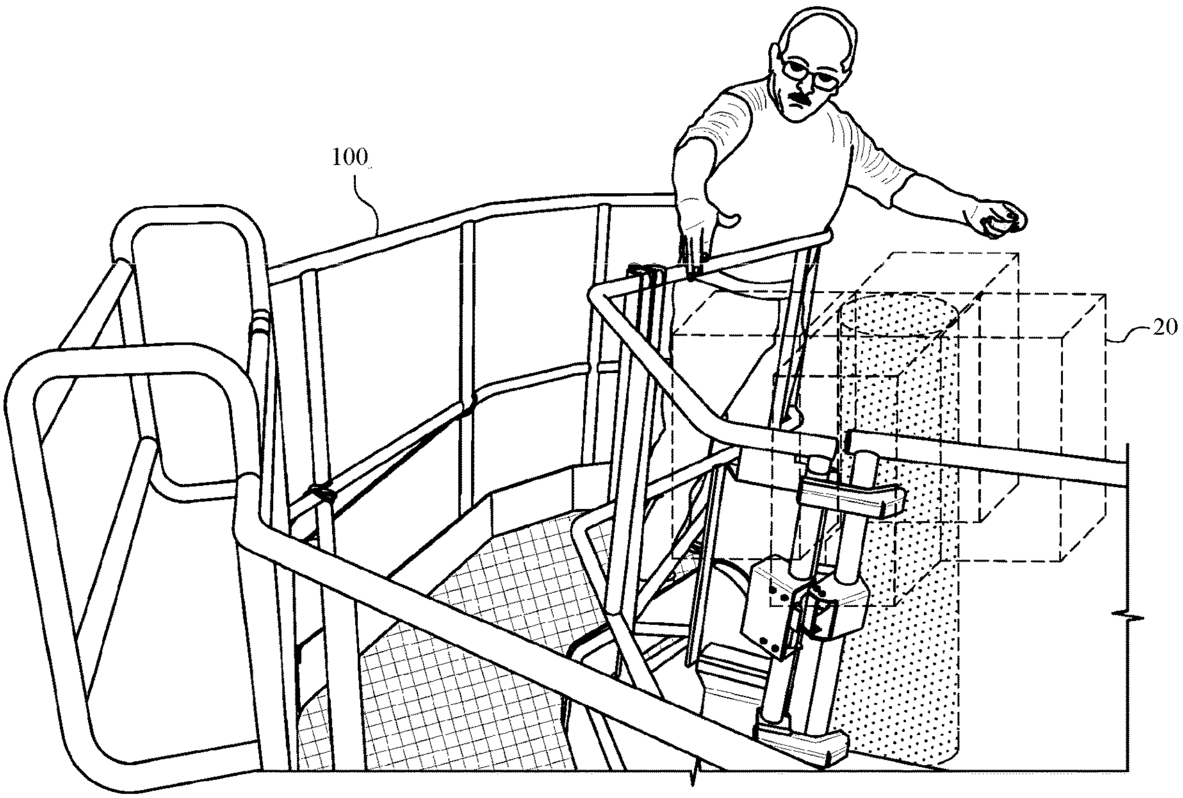
FIG. 7 shows a different photograph of the prototype of the concave personnel basket from a different angle. In this photograph, the concave structure of the basket allows personnel standing inside of the basket to access multiple sides of an elevated convex structure, such as a cell tower (shown in dashed lines) without the need to be constantly repositioning the boom lift. This user can access three sides of the cell tower by merely moving about the basket.

FIG. 7 shows a different photograph of the prototype of the concave personnel (100) basket from a different angle. In this photograph, the concave structure of the basket allows personnel standing inside the basket to access multiple sides of an elevated convex structure (20), such as a cell tower (shown in dashed lines). Using the invention, the workers can access different sides without constantly repositioning the boom lift. This user can access three sides of the cell tower by merely moving about the basket. This avoids the extra time and risk associated with repositioning the boom lift. This, in turn, improves efficiency and safety.

The invention claimed is:

1. A personnel basket for an aerial work platform comprising a boom lift, said basket comprising:

a basket floor with a floor top, a bonded, symmetrical, polygonal floor bottom, and a bonded, symmetrical, polygonal floor perimeter with a plurality of floor sides, said floor bottom configured with a flat center portion of said floor bottom configured to attach to a boom lift arm on a boom lift side of said floor perimeter by a basket rotator and at least one support beam or bracket;

said floor bottom further comprising at least two other diagonal sides facing towards said boom lift, and at least two sides facing away from said boom lift;

said floor top configured with a substantially flat surface configured to allow at least one adult person to stand on said floor top while said floor bottom is attached to said boom lift, and lifted above the ground by said boom lift;

said floor perimeter of said basket floor and said plurality of floor sides configured with at least an away facing middle portion and two away facing opposite ends;

said away facing middle portion being flat and parallel to said flat center portion, and bonded to said two away facing opposite ends by the at least two other diagonal sides facing away from said boom lift;

said floor perimeter further configured in a concave shape with said two away facing opposite ends disposed at least two feet further away from said boom lift side relative to said away facing middle portion;

thus allowing said basket floor, and a person walking along said basket floor, to move freely throughout the platform and more closely approach multiple sides of a convex elevated work target of interest while said floor is lifted above the ground by said boom lift;

said floor perimeter further configured with a guard rail raised at least three feet above said floor top.

2. The basket of claim 1, wherein a distance between an extreme end of one opposite side and an extreme end of the other opposite side is at least six feet.

3. The basket of claim 1, wherein the portion of the guard rail associated with said away facing middle portion, which is positioned distal from said boom lift side of said floor perimeter,further comprises a safety latch type gate.

4. The basket of claim 1, wherein said guard rail further comprises at least one kick plate disposed next to said floor bottom.

5. The basket of claim 1, wherein said guard rail associated with a boom facing middle portion next to said boom lift side of said floor perimeter further comprises a support for a substantially rectangular boom lift control box.

6. The basket of claim 1, wherein said guard rail further comprises at least one safety line attachment region comprising safety line eyes or small enclosures where snap hooks or other attachment devices may be securely attached to said guard rail.

7. The basket of claim 1, wherein said basket is configured to carry at least three people and a weight of at least 800 pounds.

8. The basket of claim 1, wherein a portion of said guard rail further comprises a hinged gate and a latch configured to open and shut;

said gate configured to swing inward when said latch is open, thus enabling personnel to enter and exit said basket;

said gate configured to remain shut when said latch is shut, thus protecting personnel inside said basket from accidentally falling out of the basket.

9. The basket of claim 8, wherein said hinged gate is disposed opposite said boom lift side in said away facing middle portion.

10. The basket of claim 1, wherein at least a portion of two boom side opposite ends, and their associated guard rails, are disposed at least two feet outwards away from said boom lift side, relative to a boom facing middle portion.

11. The basket of claim 1, wherein said floor is configured as a symmetrical, concave, 12-sided irregular polygon.

12. A personnel basket for an aerial work platform comprising a boom lift, said basket comprising:

a basket floor with a floor top, a bonded, symmetrical, polygonal floor bottom, and a bonded, symmetrical, polygonal floor perimeter with a plurality of floor sides, said floor bottom configured with a flat center portion of said floor bottom configured to attach to a boom lift arm on a boom lift side of said floor perimeter by a basket rotator and at least one support beam or bracket;

said floor bottom further comprising at least two other diagonal sides facing towards said boom lift, and at least two sides facing away from said boom lift;

said floor top configured with a substantially flat surface configured to allow at least one adult person to stand on said floor top while said floor bottom is attached to said boom lift, and lifted above the ground by said boom lift;

said floor perimeter of said basket floor and said plurality of floor sides configured with at least an away facing middle portion and two away facing opposite ends;

said away facing middle portion being flat and parallel to said flat center portion, and bonded to said two away facing opposite ends by the at least two other diagonal sides facing away from said boom lift;

said floor perimeter further configured in a concave shape with said two away facing opposite ends disposed at least two feet further away from said boom lift side relative to said away facing middle portion;

thus allowing said basket floor, and a person walking along said basket floor, to move freely throughout the platform and to more closely approach multiple sides of a convex elevated work target of interest while said floor is lifted above the ground by said boom lift;

said floor perimeter further configured with a guard rail raised at least three feet above said floor top;

wherein said guard rail associated with a boom facing middle portion next to said boom lift side of said floor perimeter further comprises a support for a substantially rectangular boom lift control box;

wherein a portion of said guard rail associated with said away facing middle portion further comprises a hinged gate and a latch configured to open and shut;

said gate configured to swing inward when said latch is open, thus enabling personnel to enter and exit said basket;

said gate configured to remain shut when said latch is shut, thus protecting personnel inside said basket from accidentally falling out of the basket;

wherein said hinged gate is disposed opposite said boom lift side in said away facing middle portion.

13. The basket of claim 12, wherein a distance between an extreme end of one opposite side and an extreme end of the other opposite side is at least six feet.

14. The basket of claim 12, wherein said latch further comprises a safety latch.

15. The basket of claim 12, wherein said guard rail further comprises at least one kick plate disposed next to said floor bottom.

16. The basket of claim 12, wherein said guard rail further comprises at least one safety line attachment region comprising safety line eyes or small enclosures where snap hooks or other attachment devices may be securely attached to said guard rail.

17. The basket of claim 12, wherein said basket is configured to carry at least three people and a weight of at least 800 pounds.

18. The basket of claim 12, wherein said floor is configured as a symmetrical, concave, 12-sided irregular polygon.

* * * * *